United States Patent [19]

Nuimura

[11] Patent Number: 4,989,151
[45] Date of Patent: Jan. 29, 1991

[54] NAVIGATION APPARATUS AND MATCHING METHOD FOR NAVIGATION

[75] Inventor: Yoshimi Nuimura, Gyoda, Japan

[73] Assignee: Kabushiki Kaisha Toshiba, Kawasaki, Japan

[21] Appl. No.: 311,831

[22] Filed: Feb. 17, 1989

[30] Foreign Application Priority Data

Feb. 23, 1988 [JP] Japan .................................. 63-40170

[51] Int. Cl.[5] .............................................. G06F 15/50
[52] U.S. Cl. ................................... 364/449; 340/990; 340/995; 73/178 R
[58] Field of Search ........................ 364/443, 444, 449; 73/178 R; 340/988, 990, 995

[56] References Cited

U.S. PATENT DOCUMENTS

| 4,680,715 | 7/1987 | Pawelek | 364/449 |
|---|---|---|---|
| 4,688,176 | 8/1987 | Hirata | 364/449 |
| 4,774,671 | 9/1988 | Itoh et al. | 364/449 |
| 4,792,907 | 12/1988 | Ikeda et al. | 364/449 |
| 4,796,189 | 1/1989 | Nakayama et al. | 364/449 |
| 4,812,845 | 3/1989 | Yamada et al. | 364/449 |
| 4,814,989 | 3/1989 | Döbereiner et al. | 364/449 |
| 4,827,420 | 5/1989 | Musa | 364/449 |

FOREIGN PATENT DOCUMENTS

| 0181012 | 5/1986 | European Pat. Off. . |
| 0242050 | 10/1987 | European Pat. Off. . |
| 2085162 | 4/1982 | United Kingdom . |
| 2089036 | 6/1982 | United Kingdom . |
| 2180066 | 3/1987 | United Kingdom . |
| 2192058 | 12/1987 | United Kingdom . |

OTHER PUBLICATIONS

Nikkei Electronics Nov. 16, 1987 (No. 434) pp. 119 to 130, "Automobile CD-ROM Navigation System Begins to be Commercialized".

Primary Examiner—Gary Chin
Attorney, Agent, or Firm—Cushman, Darby & Cushman

[57] ABSTRACT

A navigation apparatus, which is carried on a vehicle, computes the present positions of the vehicle by using the data collected by various types of sensors, and visually presents the computed present positions on a display. An absolute position data membory stores the surveyed data of the previously surveyed reference points in correspondence with the reference points. A key input device generates a passing signal indicating that the vehicle has actually passed on the the reference points. is response to the operationm of a matching key. When receiving the passing signal, a CPU compares the survey data of the reference points stored in the map data storing means with the present position data calculated by using the data derived from the sensors, selects the surveyed data of a reference point of which surveyed data provides the smallest difference between the reference point and the present position data, and corrects the present position data so that is becomes the selected surveyed data.

12 Claims, 5 Drawing Sheets

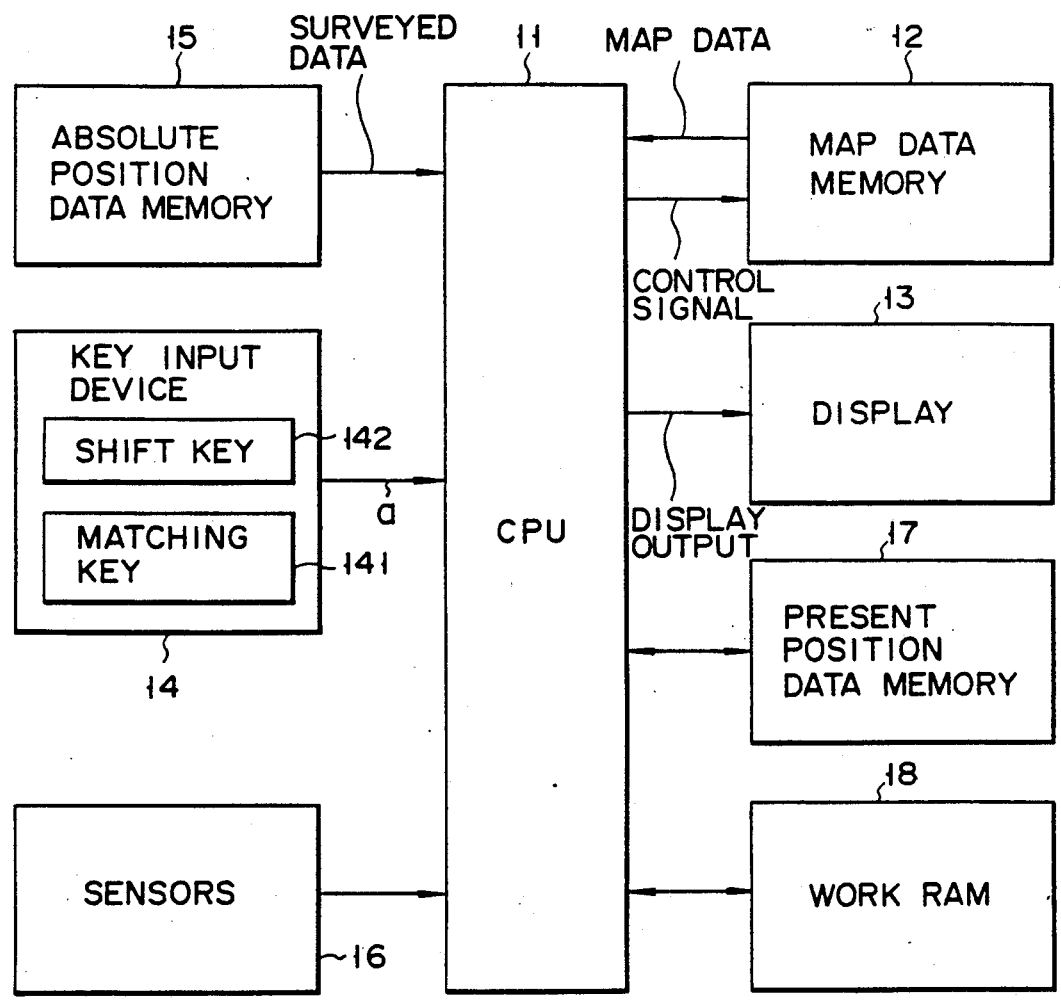
F I G. 1

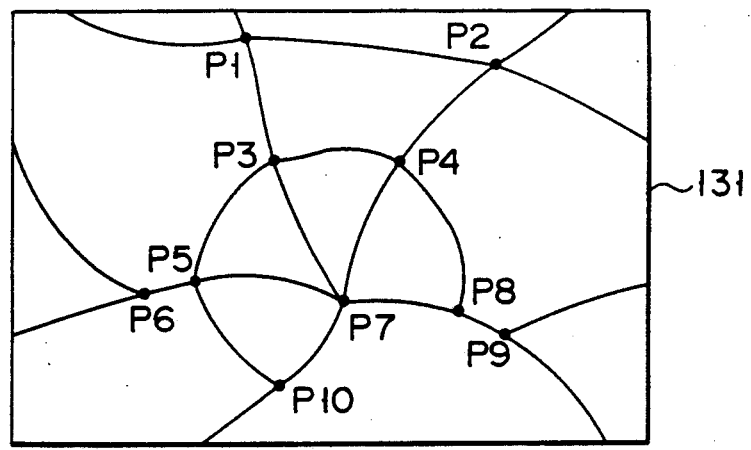
F I G. 2
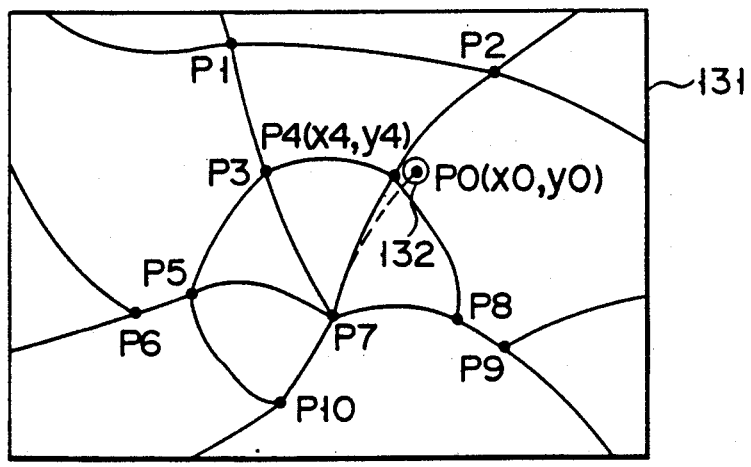
F I G. 3
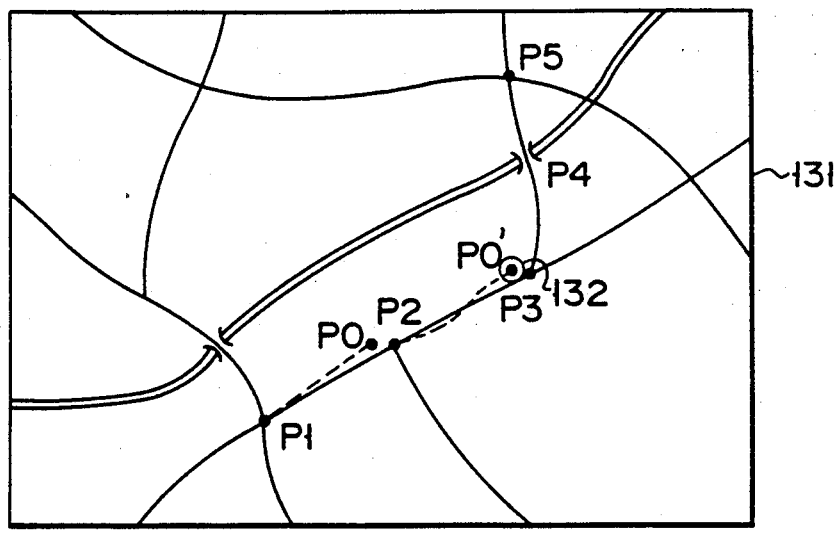
F I G. 7

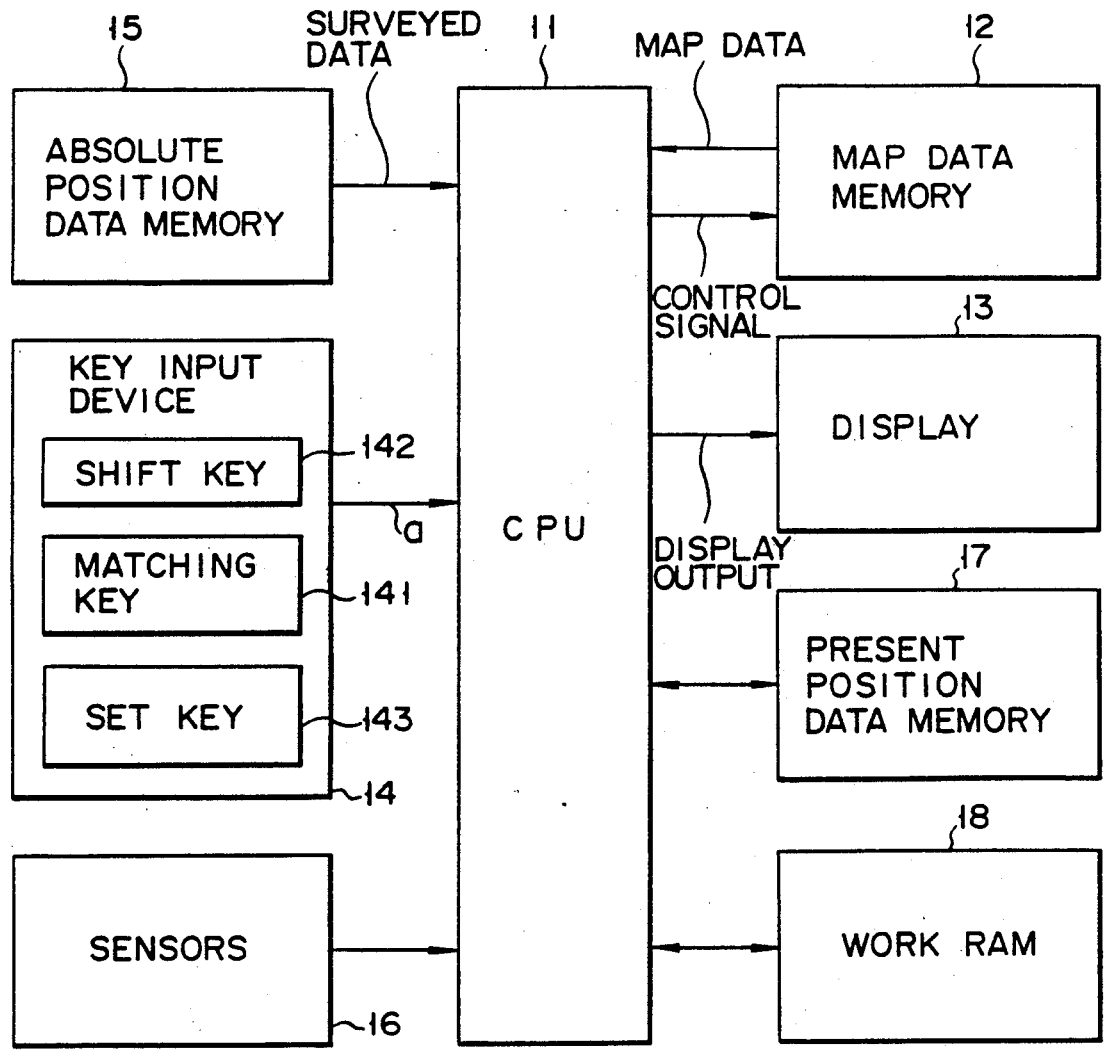
F I G. 5

NAVIGATION APPARATUS AND MATCHING METHOD FOR NAVIGATION

BACKGROUND OF THE INVENTION

1. Field of the Invention

The present invention relates to a navigation apparatus for use with a vehicle such as an automobile and to a matching method for navigation.

2. Description of the Related Art

Recently, in many companies, laboratories, and the like, a navigation system for use with a vehicle, for example, an automobile, has been actively developed. New and improved products of the navigation system have been marketed one after another. Generally, a navigation apparatus is carried in a vehicle, and is made up of a microcomputer, various types of sensors, a display, and the like. It employs a so-called conjecture navigation method for its navigation. The sensors collect necessary data, then the microcomputer properly processes the collected data to obtain the present position of the vehicle. The display displays the present position or a locus representing the progressive path of the vehicle on a displayed map. The driver can be aware of the present position, and determine a route to a destination, or be kept informed of the route along which the vehicle is going.

The navigation apparatus uses the present position data as calculated by using various types of data collected by the sensors, such as speed, direction, and running time, and the prestored exact position data (absolute position data or surveyed data) of specific positions, which overlay a map being displayed on the screen of the apparatus. As the vehicle moves, the matching of the various data with the surveyed data is lost and the difference between them accumuatively increases. Some measure must be taken to deal with this problem. This measure exists and is called a map matching technique. So far as we know, there is no map matching technique able to satisfactorily solve the above problem.

In one approach for map matching, the surveyed data is collated probability-functionally with 3-dimensional map error, error involved in surveying specific positions, and errors due to data being displayed as combinations of curves and approximated linear curves. This approach succeeds in obtaining an exact matching under simple and typical load conditions, but as a satisfactory matching technique under complicated road conditions, however, it requires many intricate processes. Further, size reduction of navigation apparatuses based on the above approach is very difficult, leading to cost increases.

SUMMARY OF THE INVENTION

Accordingly, an object of the present invention is to provide a navigation apparatus, which performs exact map matching, having a simple structure.

Another object of the present invention is to provide a matching method capable of exact map matching in a simple manner.

According to one aspect of the present invention, there is provided a navigation apparatus which is carried on a vehicle, computes the present positions of the vehicle, and visually presents the computed present positions, comprising:

map data storing means for storing data of a map to be displayed, the map including reference point, the map data storing means storing the surveyed data corresponding to the reference point, the surveyed data being data which indicates the previously surveyed absolute position of the reference point;

sensor means for sensing at least the speed and moving direction of the vehicle, the sensor means including a speed sensor and a direction sensor;

position calculating means for calculating present position data representing the present position of the vehicle on the basis of the data collected by the sensor means;

display means for displaying a map based on the map data stored in the map data storing means, the display means displaying the present position of the vehicle as a mark overlaid on the displayed map, based on the present position data calculated by the position calculating means;

key-in means for generating a passing signal indicating that the vehicle has actually passed the reference point, through the operation of a predetermined key; and position correcting means, when receiving the passing signal, the position correcting means correcting the present position data so that the present position data becomes the surveyed data, by comparing the surveyed data of the reference point stored in the map data storing means with the present position data calculated by the position calculating means.

According to another aspect of the present invention, there is provided a map matching method in which in a navigation apparatus, which is carried in a vehicle, computes the present position of the vehicle, and visually presents the computed present position, comprising: map data storing means for storing data of a map to be displayed, the map including reference point, the map data storing means storing the surveyed data corresponding to the reference point, the surveyed data being data which indicates the previously surveyed absolute position of the reference point; sensor means for sensing at least the speed and moving direction of the vehicle, the sensor means including a speed sensor and a direction sensor; position calculating means for calculating present position data representing the present position of the vehicle on the basis of the data collected by the sensor means; display means for displaying a map based on the map data stored in the map data storing means, and the display means displaying the present position of the vehicle as a mark overlaid on the displayed map, based on the present position data calculated by the position calculating means, the map matching method for matching the present position data calculated by the position calculating means with the surveyed data comprising:

a first step of generating a passing signal indicating that the vehicle has actually passed the reference point, through the operation of a predetermined key of the key-in means which is operated when the vehicle actually passes the reference point;

a second step of comparing the surveyed data of the reference point stored in the map data storing means with the present position data calculated by the position calculating means, when the passing signal is generated, thereby obtaining the difference between them; and a third step of correcting the present position data on the basis of the difference obtained in the second step.

BRIEF DESCRIPTION OF THE DRAWINGS

FIG. 1 is a block diagram showing a navigation apparatus according to a first embodiment of the present invention;

FIGS. 2 and 3 show displayed maps useful in explaining the operation of the navigation apparatus of FIG. 1;

FIG. 5 is a block diagram showing a navigation apparatus according to a second embodiment of the present invention;

FIG. 7 shows a displayed map useful in explaining the operation of the navigation apparatus of FIG. 5.

DETAILED DESCRIPTION OF THE PREFERRED EMBODIMENTS

Figure 4:
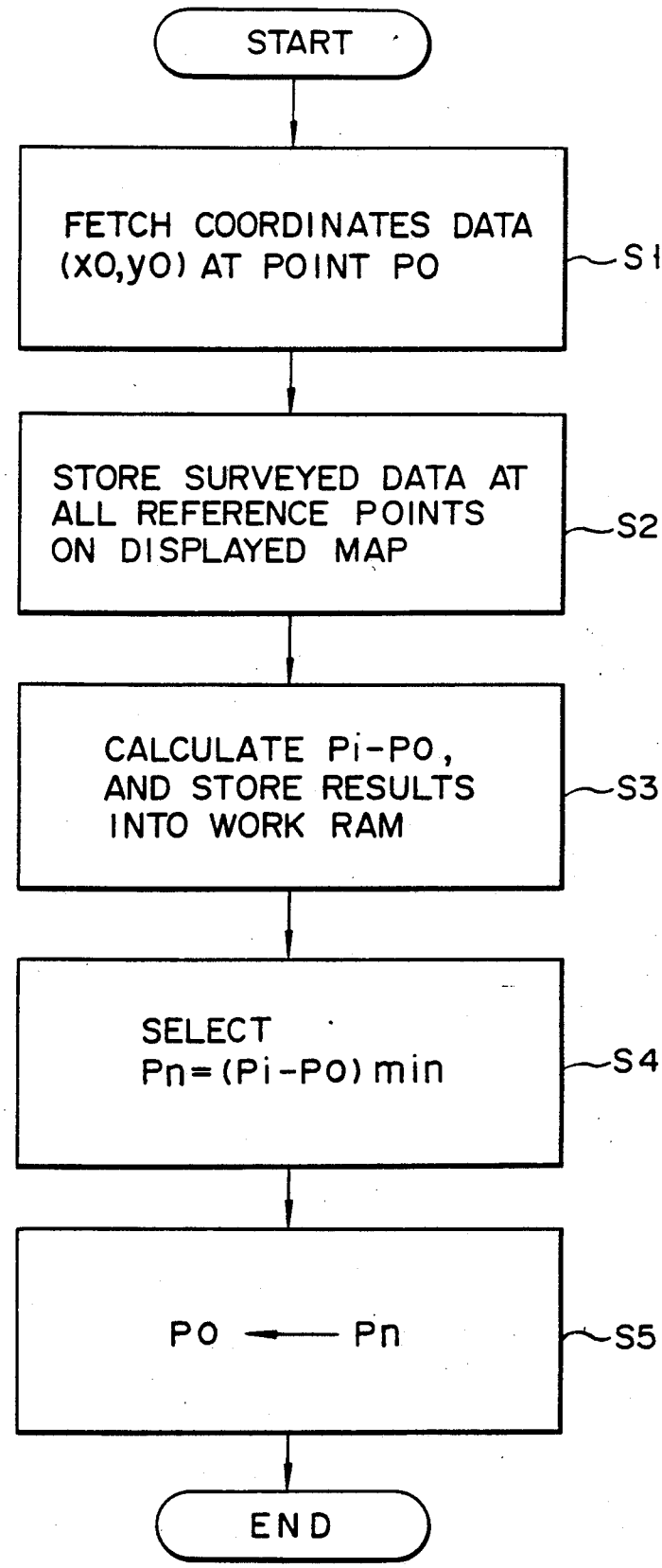
FIG. 4 shows a flowchart for explaining the operation of the navigation apparatus of FIG. 1.

FIG. 1 is a block diagram showing a first embodiment of a navigation apparatus according to the present invention. The navigation apparatus is made up of a central processing unit (CPU) 11, map data memory 12, display 13, key input device 14, absolute position data memory 15, various types of sensors 16, present position data memory 17, and work RAM 18.

The map data memory 12 is a memory storing map data, such as a compact disc (CD) ROM. The display 13 for visually presenting map information may be a CRT display, a liquid crystal panel, or the like. The key input device 14 may be a touch panel located on the screen of the display 13. The key input device 14 is provided with a matching key 141. The absolute position data memory 15 stores specific positions (reference points) as surveyed, which are contained in the map data stored in the map data memory 12. The reference points are, for example, intersections and turning points of main roads, marked buildings and facilities by and near main roads, and the like. This absolute position data memory 15 may be incorporated into the CD ROM of the map data memory 12, if necessary.

Those sensors 16 contain a speed sensor, absolute direction sensor based on earth magnetism, gradient sensor, and the like. The CPU 11 decodes the data derived from those sensors, works out the present position, stores the data of the present position in the present position data memory 17, and reads out the stored present position data. Further, the CPU 11 indicates the present position of the vehicle carrying the navigation apparatus, and a locus indicating the path of the vehicle thus far traveled. The indication is shown on the screen of the display 13 by a position cursor.

The operation of the navigation apparatus thus arranged will be described with reference to FIGS. 2 through 4.

A map displayed on a screen 131 of the display 13, which is a visual representation of the map data stored in the map data memory 12, is illustrated in FIG. 2. In the map, points P1 through P10 as reference points indicate the intersections of roads. The absolute position data memory 15 stores the surveyed data of those reference points in connection with the map data.

It is now assumed that a vehicle starts to move at point P7, and moves toward point P4 (FIG. 3). Through the movement, the CPU carried on the vehicle collects various data by the sensors 16, and periodically calculates changing present positions. With the movement of the vehicle, a position cursor 132 moves and traces a locus indicating the progressive path of the vehicle. The path is indicated by a dotted line in FIG. 3. The displayed locus indicates the path through which the vehicle has actually passed. Therefore, as the vehicle moves, it deviates from the road depicted on the display screen 131.

An operator or driver operates the matching key 141 as the vehicle passes through intersection P4, when point P0 of the cursor 132 deviates significantly from the intersection P4 (FIG. 3). Upon the operation of the matching key 141, the key input device 14 produces a signal "a" (FIG. 1). The CPU 11 receives the signal "a" and executes the program flowchart as shown in FIG. 4. The operation of the navigation apparatus based on the program will be described below.

In response to the signal "a" from the key input device 14, the CPU 11 reads out the present position data viz., the coordinates data (x0, y0) at point P0, from the present position data memory 17, and loads it into an internal register (not shown) (step S1). Following the loading of the present position data, the CPU 11 reads out the set of surveyed data of all the reference points P1 to P10 displayed on the screen 131 from the absolute position data memory 15, and stores them into the work RAM 18 (step S2).

The CPU 11 sequentially reads out the reference point data from the work RAM 18, calculates the difference between the read out data and the point P0 data (x0, y0) stored in the internal register, and stores the results of the calculation in the work RAM 18 (step S3). Assuming that the data of the respective points P1 to P10 is (xi, yi), and a distance between the respective points and point P0 is L, L can be given by the following equation, $$L = \sqrt{(xi - x0)^2 + (yi - y0)^2} \quad (1)$$

Then, the CPU 11 calculates a minimum value of the results of the above calculation as are stored in the work RAM 18, viz., the smallest difference of those differences L between point P0 and points P1 to P10 (step S4). After obtaining a point Pn (P4 in FIG. 3) providing the smallest difference, or distance L, the CPU updates the present position data in the present position data memory 17 to the data (xn, yn) at this point Pn (step S5). The result is to move the cursor 132 at point P0(x0, y0) to point P4 on the screen 131.

Actually, the correction of the cursor point is instantaneously performed by the CPU 11, and the operator can correct the cursor position merely by pushing the matching key 141.

If accumulative error is great, there may exist a point having a longer distance than distance L from the correct reference point. In this case, the cursor 132 moves to the incorrect point. This is a rare case. If such a case is encountered, the correct position can be readily obtained by operating a shift key 142 (FIG. 1) provided in the key input device 14, which is for shifting the present position vertically and horizontally.

A second embodiment of a navigation apparatus according to the present invention will be described.

FIG. 5 is a block diagram showing a second embodiment of a navigation apparatus according to the present invention. This navigation apparatus, like that of the first embodiment, is made up of CPU 11, map data memory 12, display 13, key input device 14, absolute position data memory 15, various types of sensors 16, present position data memory 17, and work RAM 18.

The key input device 14 additionally uses a set key 143. This key is used to designate reference points to be compared.

Figure 6:
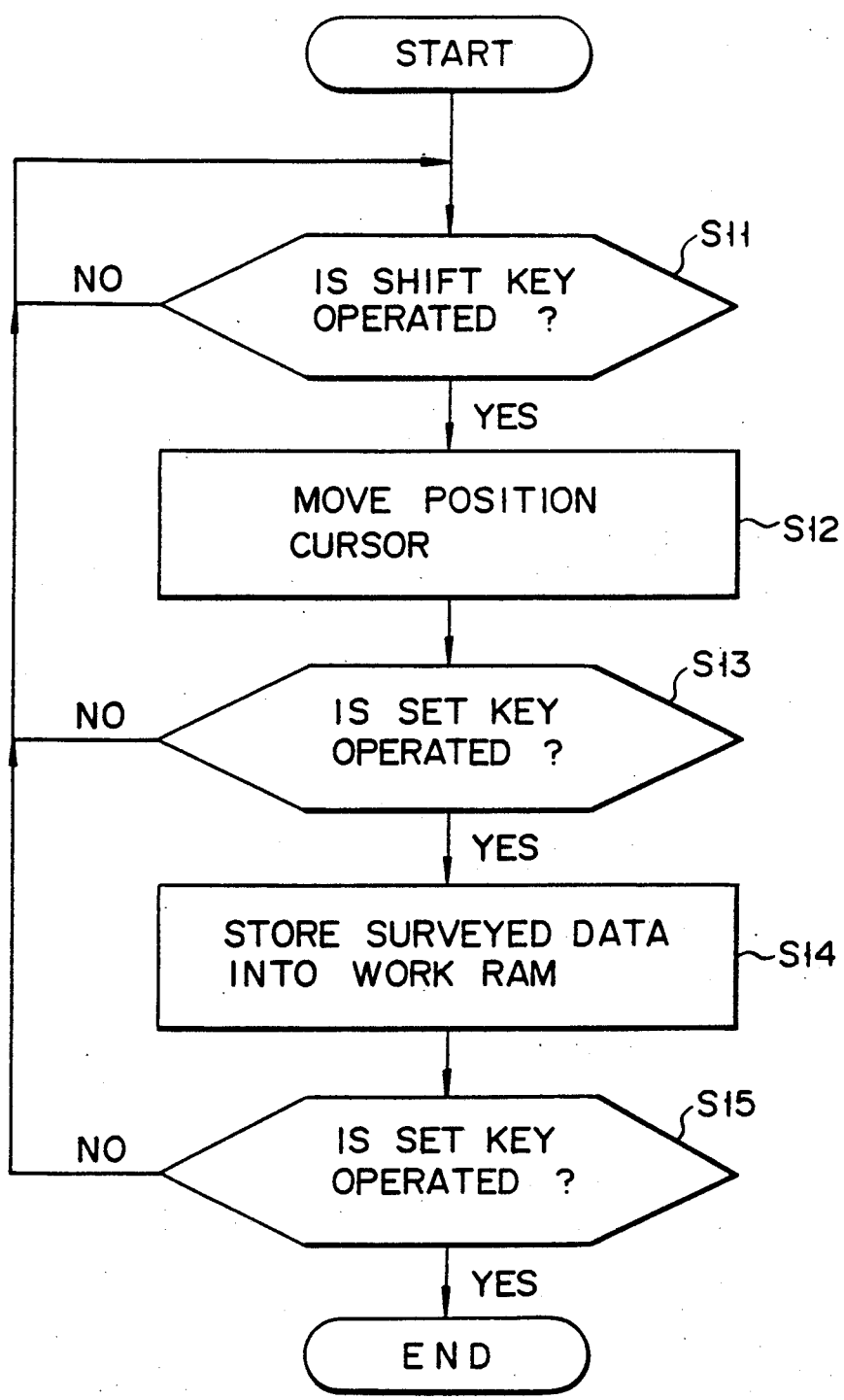
FIG. 6 shows a flowchart for explaining how reference points to be compared are designated.

Upon operation of the set key 143, the CPU 11 places the navigation apparatus in a reference point setting mode, and executes a program flowcharted as shown in FIG. 6. When the shift key 142 (step S11) is pushed, the position cursor 132 moves toward a reference point to be compared (step S12). After the reference point is reached, the set key 143 is operated (step S13). In response to the operation of the set key 143, the CPU 11 reads out the surveyed data for the reference point from the absolute position data memory 15, and stores it into the work RAM 18 (step S14). To store another reference point, the shift key 142 is operated again. To remove the set mode, at that position the set key 143 is again operated (step S15). Otherwise, an end key, if additionally provided, may be used for effecting the same operation.

After the reference points to be compare are designated and the vehicle continues to move, if the matching key 141 is operated, the CPU 11 executes the job as referred to in connection with FIG. 4, which is applied to only the designated reference point stored in the work RAM 18.

Let us consider a case wherein a vehicle moves from point P1 to P5 in FIG. 7. The driver sets reference points P2, P3 and P4 along the route up to the destination. It is noted that the reference points for matching exist only along the route, so that the possibility that the present position is set with incorrect reference points is virtually eliminated. Further, there is no need for the map matching job to calculate the differences L and to determine the minimum difference applied to all the reference points on the map. This feature allows high speed processing by the CPU.

As seen from the foregoing description, the navigation apparatus can depict exactly the locus of the vehicle movement by applying the map matching operation to only the reference points of surveyed data which are stored. Therefore, the display of the path of the vehicle as passed is very exact.

Thus, according to the present invention, a satisfactory map matching technique can be realized by using a simple apparatus based on the conjecture navigation technique, not based on a complicated and high order technique, such as satellite navigation or radio navigation technique.

Incidentally, the work RAM 18 may double as the present position data storing means 17.

What is claimed is:

1. A navigation apparatus which is carried on a vehicle, computes present positions of the vehicle, and visually presents the computed present positions, comprising:
   map data storing means for storing data of a map to be displayed, said map including at least one reference point, said map data storing means storing surveyed data corresponding to said reference point, the surveyed data being data which indicates a previously determined absolute position of the reference point;
   sensor means for sensing at least a speed and moving direction of the vehicle, said sensor means including a speed sensor and a direction sensor;
   position calculating means for calculating present position data representing a present position of the vehicle on the basis of the data collected by said sensor means;
   display means for displaying a map based on the map data stored in said map data storing means, and for displaying the present position of the vehicle as a mark overlaid on the displayed map, based on the present position data calculated by said calculating means;
   key-in means for generating a passing signal indicating that the vehicle has actually passed said reference point, through operation of a predetermined key; and position correcting means includes first correcting means for, when receiving said passing signal, comparing the surveyed data of a plurality of reference points stored in said map data storing means with the present position data calculated by said position calculating means, selecting the surveyed data of a reference point of which the surveyed data corresponds to the smallest difference between the reference point and the present position data, and correcting said present position data so that it corresponds to said selected surveyed data.

2. The apparatus according to claim 1, further comprising:
   present position data storing means for storing the present position data corrected by said position correcting means; and
   display controlling means for causing said display means to display the present position of the vehicle based on the present position data stored in said present position data storing means.

3. The apparatus according to claim 1, wherein said first correcting means includes second correcting means for comparing the present position data calculated by said position calculating means with the surveyed data of the reference points being currently displayed by said display means, which are the surveyed data of the respective reference points stored in said map data storing means.

4. The apparatus according to claim 3, wherein
   said key-in means includes a designating means for designating desired reference points of those points displayed by said display means; and
   said second correcting means includes third correcting means for comparing the present position data calculated by said position calculating means with the surveyed data of the reference points designated by said designating means, which are the surveyed data of the respective reference points stored in said map data storing means.

5. The apparatus according to claim 4, wherein:
   said display means displays a position cursor to indicate the present position on the displayed map; and
   said designating means includes a movement designating key for moving said position cursor displayed by said display means and a reference point on the map on which said position cursor overlays, as one of the desired reference points.

6. The apparatus according to claim 5, further comprising:
   read means for reading out the surveyed data of the desired reference points designated by said reference point designating key from said map data storing means; and desired reference position storing means for storing the surveyed data read out by said read means, and wherein said third correcting means includes fourth correcting means for comparing the present position data calculated by said position calculating means with the surveyed data of the respective reference points stored in said desired reference position storing means.

7. In a navigation apparatus which is carried on a vehicle, computes a present position of the vehicle, and visually presents the computed present position, comprising: map data storing means for storing data of a map to be displayed, said map including at least one reference point, said map data storing means storing the surveyed data corresponding to said reference point, the surveyed data being data which indicates a previously surveyed absolute position of the reference point; sensor means for sensing at least the speed and moving direction of the vehicle, said sensor means including a speed sensor and a direction sensor; position calculating means for calculating present position data representing the present position of the vehicle on the basis of the data collected by said sensor means; display means for displaying a map based on the map data stored in said map data storing means, and said mark overlaid on the displayed map, based on the present position data calculated by said position calculating means, a method for matching the present position data calculated by said position calculating means with said surveyed data, comprising:

a first step of generating a passing signal indicating that the vehicle has actually passed said reference point, through the operation of a predetermined key of a key-in means which is operated when said vehicle actually passes said reference point;

a second step of comparing the surveyed data of each of a plurality of reference points stored in said map data storing means with the present position data calculated by said position calculating means, when said pressing signal is generated, to obtain differences between each of said reference points and said present position data; a third step of selecting the surveyed data of one of said reference points of which the surveyed data corresponds to the smallest one of said differences, and a fourth step of correcting said present position data so that it corresponds to said selected surveyed data.

8. The method according to claim 7, further comprising:

a fifth step of storing the present position data as corrected in said fourth step; and a sixth step of displaying the present position of the vehicle based on the present position data stored in said fifth step.

9. The method according to claim 7, wherein said second step includes a fifth step of comparing the present position data calculated by said position calculating means with the surveyed data of the reference points being currently displayed by said display means, which are the surveyed data of the respective reference points stored in said map data storing means, thereby obtaining the differences between them.

10. The method according to claim 9, further comprising a sixth step of designating desired reference points of those points displayed by said display means, and wherein said fifth step includes a seventh step of comparing the present position data calculated by said position calculating means with the surveyed data of the reference points designated in said sixth step, which are the surveyed data of the respective reference points stored in said map data storing means.

11. The method according to claim 10 further including an eighth step of displaying a position cursor to indicate the present position on the displayed map displayed by said display means, on the basis of said present position data, and said sixth step includes a ninth step of moving said position cursor toward a desired reference position on the displayed map, and a tenth step of designating a reference point on the map on which said position cursor overlays, as one of the desired reference points.

12. The method according to claim 11, further comprising:

a 11th step of reading out the surveyed data of the desired reference points designated in said tenth step; and a 12th step of storing the surveyed data read out in said 11th step, and wherein said seventh step includes a 13th step of comparing the present position data calculated by said position calculating means with the surveyed data of the respective reference points stored in said 12th step, thereby obtaining the differences between them.

* * * * *